(12) United States Patent
Vallance

(10) Patent No.: US 6,276,867 B1
(45) Date of Patent: Aug. 21, 2001

(54) JOINT FORMING DEVICES

(75) Inventor: William Ernest Taylor Vallance, Buckinghamshire (GB)

(73) Assignee: Titus International PLC, Buckinghamshire (GB)

( * ) Notice: Subject to any disclaimer, the term of this patent is extended or adjusted under 35 U.S.C. 154(b) by 0 days.

(21) Appl. No.: 09/308,137

(22) PCT Filed: May 1, 1998

(86) PCT No.: PCT/GB98/01280

§ 371 Date: May 14, 1999

§ 102(e) Date: May 14, 1999

(87) PCT Pub. No.: WO98/50705

PCT Pub. Date: Nov. 12, 1998

(30) Foreign Application Priority Data

May 1, 1997 (GB) .................................................... 9708955

(51) Int. Cl.$^7$ ............................................... F16B 12/10
(52) U.S. Cl. ........................................ 403/409.1; 403/231
(58) Field of Search ............................... 403/409.1, 230, 403/231, 245, 25.8, 297

(56) References Cited

U.S. PATENT DOCUMENTS

| | | | |
|---|---|---|---|
| 4,131,376 | * 12/1978 | Busse | 403/231 X |
| 4,518,278 | * 5/1985 | Koch | 403/230 |
| 4,728,215 | * 3/1988 | Martincic et al. | 403/231 |
| 5,284,401 | 2/1994 | Harley | 403/409 |
| 5,567,081 | 10/1996 | Vallance | 403/406.1 |
| 5,676,487 | * 10/1997 | Lautenschlager et al. | 403/231 |
| 5,772,353 | * 6/1998 | Grieser et al. | 403/231 |
| 5,788,395 | * 8/1998 | Grieser et al. | 403/231 |
| 5,823,700 | * 10/1998 | Poworoznck | 403/245 |
| 5,906,453 | * 5/1999 | Grieser et al. | 403/409.1 |
| 6,142,700 | * 11/2000 | Grieser et al. | 403/297 X |

* cited by examiner

*Primary Examiner*—Harry C. Kim
(74) *Attorney, Agent, or Firm*—Fitzpatrick, Cella, Harper & Scinto (57) ABSTRACT

A cam and expandable dowel type device is provided for joining together two members, e.g., furniture components. The cam is rotatably mounted in a first of the members and designed to engage a head portion of the sleeved dowel protruding from the second member. Rotation of the cam displaces the dowel relative to the sleeve, causing the end of the sleeve to expand and thus anchor the sleeved dowel in the second member. Further rotation of the cam causes the two members to be drawn tightly together. The camming element is designed to have a working rotational capacity of at least 190°.

31 Claims, 5 Drawing Sheets

JOINT FORMING DEVICES

This invention relates to devices for forming a joint between two members and particularly, but not exclusively, to camming elements for such devices.

A known joint forming device disclosed in GB 2241299B comprises an elongate fastening element in the form of a metal pin which is secured to a major surface of one joint member and a rotatable metal camming element which is fitted to the other joint member. The camming element defines a centrally disposed cavity and an opening in its peripheral wall which allows a head portion of the pin to be inserted into the hollow region. A slot extends from the opening around the periphery of the camming element. The slot is sized to receive a neck portion of the pin such that the camming element can be rotated about its axis of rotation with the head inserted in the cavity. The camming element defines respective camming surfaces adjacent each side of the slot for engaging the head of the pin. The camming surfaces are adapted such that as the camming element is rotated in one direction, the pin is pulled longitudinally towards the axis of rotation of the camming element.

Figure 1:
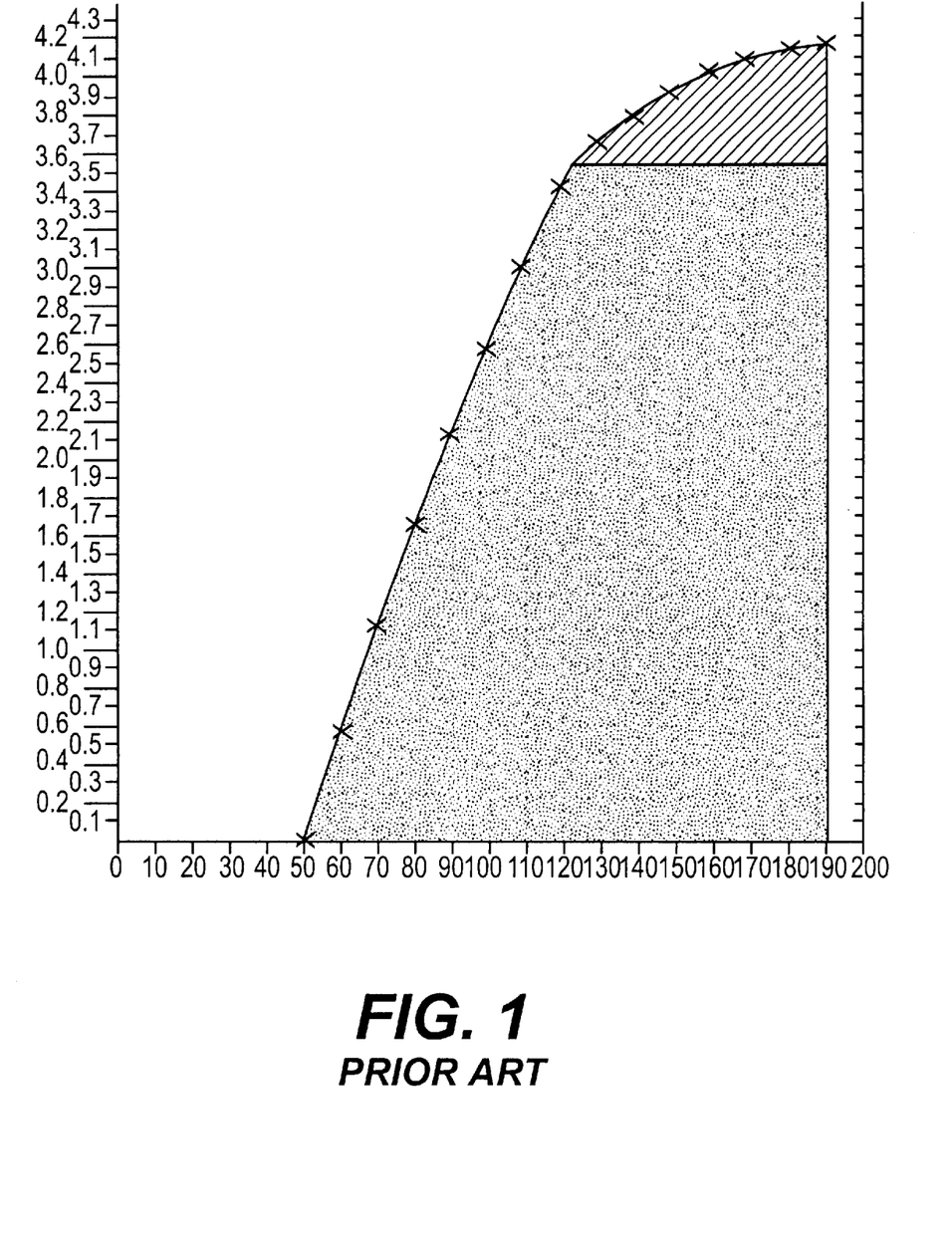
FIG. 1 is a graph showing the relationship between the amount rotation of a prior art camming element and the longitudinal movement of an elongate fastening element caused by such rotation.
Figure 2:
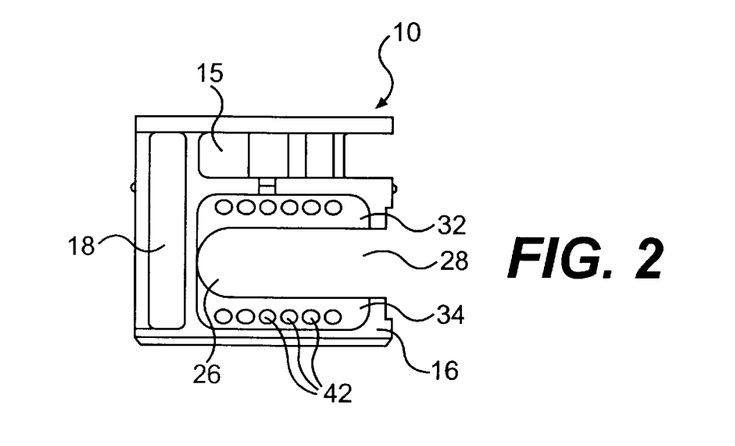
FIG. 2 is a front elevational view of a camming element according to the invention.
Figure 3:
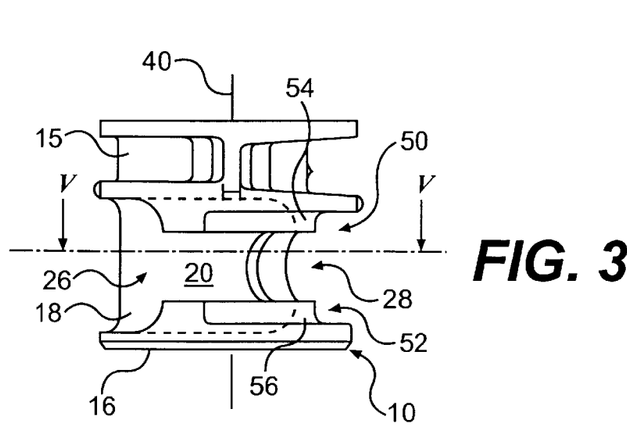
FIG. 3 is a side elevational view of the camming element.

The camming surfaces of known camming elements typically have a lengthwise profile adapted to provide a two-phase tightening action. FIG. 1 is a graph illustrating the relationship between rotation of the camming element and longitudinal movement of the fastening element in a conventional joint forming device and showing the two-phase tightening action. Longitudinal movement in mm is indicated along the vertical axis and rotation in degrees is indicated along the horizontal axis. In the first phase, a relatively "coarse movement" of the pin is provided by portions of the camming surfaces having a relatively steep, or tight, curve, i.e. a curvature adapted to provide a relatively large amount of longitudinal movement of the fastening element for a relatively small amount of rotation of the camming element. The relationship between the rotation of the camming element and the longitudinal movement caused is non-linear and is typically in excess of 0.5 mm for each 10° of rotation. This "coarse movement" is provided for closing a gap between the two panels and causing them to be pulled together, a movement often referred to as pull-up. The second phase of pin movement is caused by portions of the camming surfaces having a relatively flatter curve. The second-phase movement increases the compressive force on the joint and the reduced curvature of the camming surfaces imparts a degree of self-locking, often referred to as lock-up, to the joint forming device. It will be appreciated that the steeper the curve of the camming surfaces at the point of engagement with the head portion of the pin, the more likely it is that the camming element will back-off, i.e. rotate in the sense opposite to the sense in which it is rotated in order to tighten the joint when the panels are loaded in use. Accordingly, camming elements designed to provide the above-mentioned two-phase pin movement are intended to be rotated sufficiently during tightening of the joint to ensure engagement between the head portion of the pin and the flatter portions of the camming surfaces to obtain so-called lock-up.

In the use of the camming element which is the subject of FIG. 1, the camming element is rotated approximately 50 degrees from the position in which the head portion of the pin is inserted into the hollow region before the camming surfaces engage the head portion. The camming element must then be rotated a further 75 degrees before effective locking of the joint is obtained.

There are several disadvantages with these conventional joint forming devices and their camming elements.

One disadvantage is that relatively high turning forces are required to rotate the camming element during the pull-up phase. It will be appreciated that the cam is relatively highly 'geared' during the pull-up phase and the steeper the curve of the camming surfaces, the more torque input is required from the user. It is desirable to reduce the effort required of the user.

A further problem associated with this design is that in order to cope with the relatively high forces acting on it, the camming element must be heavily built. If the camming element is not made strong, it may burst under the loads imposed on it; the phenomenon of cam bursting will be familiar to those skilled in the art.

It will be appreciated that such camming elements are produced in vast quantities usually by means of diecasting techniques. Diecasting metals are relatively expensive and it is therefore desirable to reduce the weight of metal required for each camming element as much as possible without significantly reducing the strength thereof.

A further disadvantage of the known joint forming device is that it lacks tolerance. That is, if the recesses and bores in which the device parts are fitted are not made accurately, it may not be possible to form a reliable joint.

In more detail, in use the camming element is usually fitted into a recess in a major surface of a first joint member. This recess is communicated with the edge by means of a bore which extends from the recess to the edge. This arrangement allows the head portion of the pin to be inserted into the camming element so that it can be engaged by the camming surfaces on rotation of the camming element.

If the camming element is located too close to the edge of the joint member it may prove impossible to tighten the joint since only a small portion of the length of each camming surface will be effective on rotation of the tightening element. This results in very little pulling force being applied to the fastening element so that there is little compression in the joint and thus the joint is weak.

If the camming element is located too far away from the edge of the joint member, unless an undue amount of force is applied, it is only possible to obtain a small amount of rotation of the camming element in the tightening direction. In this case it is not usually possible to rotate the camming element sufficiently for the head portion to engage the portion of the cam which provides lock-up. The result is that there is no effective locking action and the camming element will tend to back-off if the joint is loaded which results in a weak joint.

It is an object of the invention to at least partially overcome the above-described problems.

The invention provides a camming element for a device for forming a joint between two members, the camming element comprising a body which has an axis of rotation and defines a generally centrally disposed cavity for receiving a head portion of an elongate fastening element, an opening through which said head portion can be inserted into said cavity and a slot extending from said opening about said body for receiving a neck portion of said fastening element when, in use, the camming element is rotated in one direction about said axis of rotation with said head portion received in said cavity, said body further defining at least one camming surface which is adapted for engaging said head portion and in the lengthwise direction thereof has an arcuate profile which is configured such that rotation of the camming element in said one direction causes longitudinal movement of said fastening element towards said axis of rotation and said slot being adapted to permit said rotation in said one direction through an angle of at least 190 degrees.

The invention also includes a camming element for a device for forming a joint between two members, the camming element having an axis of rotation and comprising at least one camming surface which in the lengthwise direction thereof has an arcuate profile, the or each said camming surface being arranged for engaging a head portion of an elongate fastening element such that rotation of the camming element in one direction causes longitudinal movement of the fastening element towards said axis of rotation and said arcuate profile being configured to provide a constant relationship between the amount of said longitudinal movement and said rotation in said one direction over at: least 75% of the range of said rotation with the amount of said longitudinal movement being less than 0.3 mm per 10 degrees of rotation.

In order that the invention may be well understood, an In embodiment thereof, which is given by way of example only, will now be described with reference to the accompanying drawings, in which.

Referring to FIGS. 2 to 6, a device for forming a joint between two members comprises a camming element 10, a fastening element in the form of an elongate pin 12 and a sleeve 14 for the pin. The camming element 10 has a cylindrical drum-like body which comprises two generally cylindrical portions 15, 16 which are interconnected by means of a web 18 and has a nominal diameter of 15 mm. The drum-like body defines a centrally disposed cavity 20 for receiving a head portion 22 of the pin 12, a generally oblong opening 26 through which the head portion 22 can be inserted into the cavity 20 and a slot 28 which extends circumferentially about the body. The slot 28 is sized to receive a neck portion 30 of the pin 12 when, in use, the camming element is rotated clockwise (as viewed in FIGS. 5 and 6) with the head portion 22 received in the cavity 20.

A suitable aperture is provided in the uppermost surface (as viewed in FIGS. 2 and 3) of the body portion 15 to permit rotation of the camming element by means of a suitable tool such as a screwdriver or the like.

The drum-like body further defines two camming surfaces 32, 34 disposed one on each side of the slot 28. The camming surfaces 32, 34 are adapted for engaging an engaging surface 36 of the head portion 22. In the lengthwise direction thereof, the camming surfaces have an arcuate profile which is configured such that when the camming element is rotated anticlockwise whilst head portion 22 is engaged with the camming surfaces 32, 34, the pin 12 is caused to move longitudinally towards the axis of rotation 40 of the camming element.

The curvature of the arcuate profile of the camming surfaces is adapted to provide a substantially linear relationship between the amount of rotation of the camming element and the amount of longitudinal movement of the pin 12 over a substantial portion of the range of such movement as described in more detail hereinbelow.

In directions transverse the arcuate length thereof, the camming surfaces 32, 34 are concave so as to provide extensive surface contact with a convex engaging surface 36 of the pin 12.

A plurality of depressions 42 are provided in the camming surfaces 32, 34 at spaced apart locations along the length of the surfaces. The depressions 42 are configured to mate with conical protrusions 44 provided at substantially spaced apart locations on the engaging surface 36. The inter-engagement of the depressions 42 and protrusions 44 provides a ratchet-like locking mechanism which provides resistance to rotation of the camming element in both the clockwise and anticlockwise directions. For a more detailed description of the locking mechanism feature, attention is directed to the applicant's patent GB 2246826B.

Figure 5:
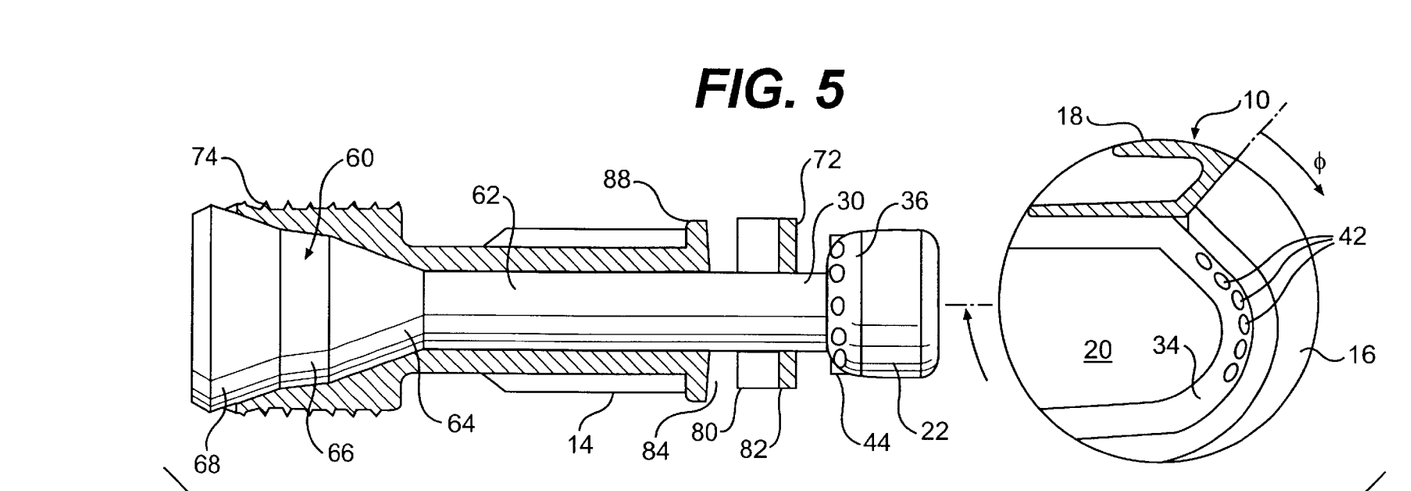
FIG. 5 is a sectional view of the camming element, fastening element and sleeve viewed along lines V—V in FIGS. 3 and 4.
Figure 6:
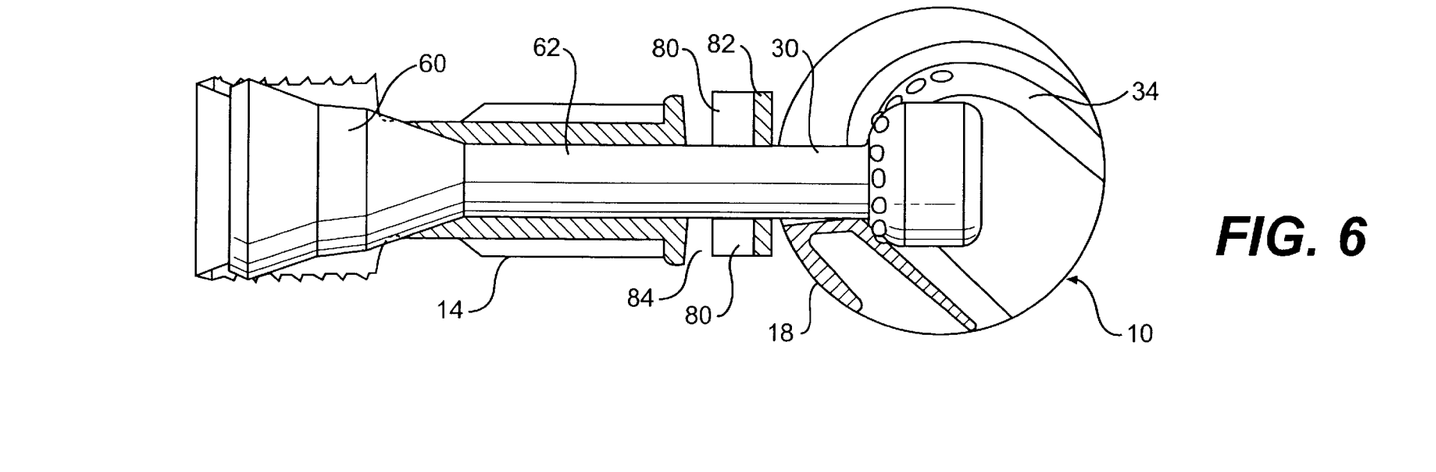
FIG. 6 is a view corresponding to FIG. 5 showing the camming element in a position of maximum rotation in the tightening direction.

Referring to FIGS. 5 and 6, it will be seen that the web 18 has a generally U-shaped cross-section and is defined by relatively thin walls. In the embodiment the walls have a thickness in the range of 0.4 to 1.0 mm. This configuration considerably reduces the weight of metal in the web and at the same time provides the necessary strength to maintain the body portions 15, 16 in a fixed spaced apart relationship. To further reduce the amount of metal used in forming the camming element, the cylindrical body portions 15, 16 are thinned in regions 50, 52 located to the rear of the camming element diametrically opposite to the opening 26 such that the camming surfaces are defined on respective ribs 54, 56 which project from the body portions 15, 16.

The web 18 defines the limit of the camming element in the tightening direction arrow A as shown by FIG. 6. The web is arranged such that the camming element can be rotated about its axis of rotation 40 through an angle φ of 225 degrees from the position in which the pin is inserted into the opening.

Preferably, the camming element is formed by diecasting using a suitable zinc diecasting alloy.

Figure 4:
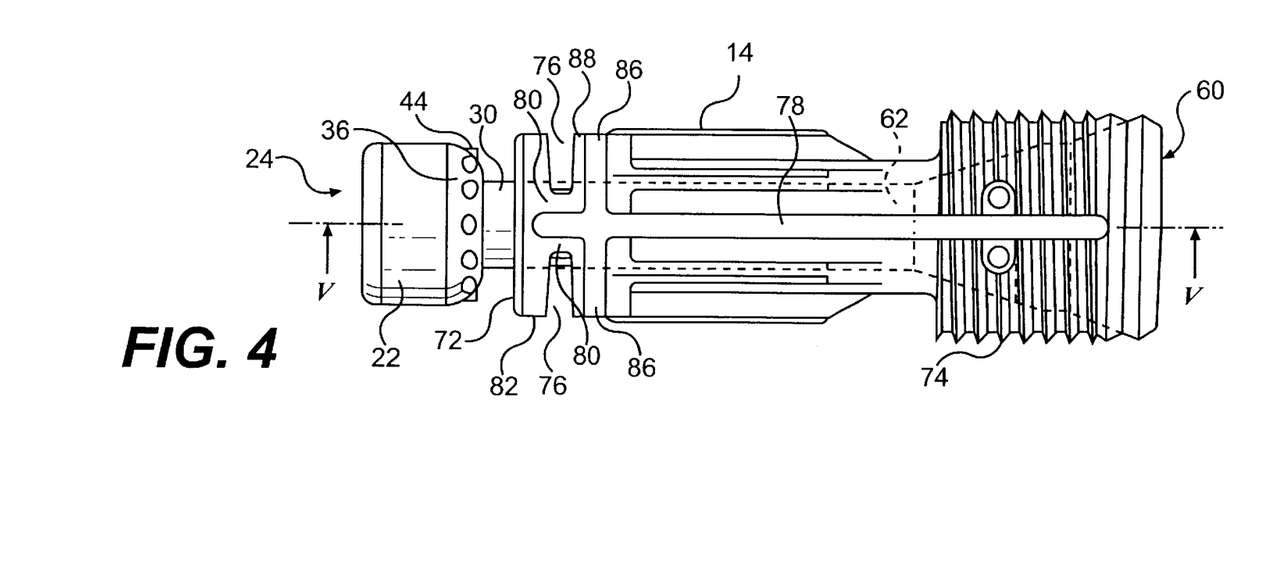
FIG. 4 shows an elongate fastening element and a sleeve for use with the camming element.

The pin 12 is preferably a diecast moulding and comprises the head portion 22, an expander portion 60 and a shank 62 which connects the head and expander portions. The shank 62 is a plain cylinder whereas the expander portion 60 comprises three frusto-conical portions 64, 66, 68 disposed in end-to-end relationship.

The sleeve 14 for the pin 12 comprises a generally annular wall which defines a through-hole extending axially between the opposed ends of the sleeve. The through-hole is configured at one end to mate with the frusto-conical portions 64, 66, 68 of the pin 12. The remainder of the through-hole is configured to fit closely around the shank 62 of the pin. It will be noted that the head portion and expander portions of the pin 12 are somewhat larger in diameter than the portion of the through-hole which surrounds the shank 62. In practice, it is envisaged that the sleeve will be made of a plastics material moulded directly onto the pin by a process known as insert moulding. Insert moulding is a technique well known to those skilled in the art and will accordingly not be described in any detail herein. Alternatively, the sleeve may comprise two parts which snap together about the pin in which case the parts of the sleeve may be hingeably connected. A further alternative is to assemble the two parts by longitudinal insertion of the pin into the sleeve.

When the sleeve is correctly fitted on the pin, there is a gap between the engaging surface 36 of the pin and an adjacent end face 72 of the sleeve. The portion of the shank 62 exposed in this gap defines the neck 30 of the pin 12.

At the end of the sleeve which houses the frusto-conical portions 64, 66, 68 of the pin, a helically extending barb 74 is provided on the outer surface of the sleeve for improving the grip between the sleeve and the joint member in which, in use, the barbed end is received. Of course, the barb 74 need not be helical and all manner of protrusions may be provided on the sleeve for the same purpose as is well known to those skilled in the art.

The sleeve 14 is provided with collapsing means whereby the sleeve is partially collapsible in the lengthwise direction thereof. The collapsing means are adapted such that the strength of the sleeve in compression is selectively reduced.

In the embodiment, the collapsing means is defined by two opposed apertures 76 each of which extends partially circumferentially of the sleeve and two cruciate apertures 78. The cruciate apertures 78 are disposed at opposite sides of the sleeve and have respective lengthwise extending portions which extend substantially over the entire length of the sleeve.

The apertures 76 are disposed at the lefthand end (as viewed in FIG. 4) of the sleeve and together with the lefthand ends of the lengthwise extending portions of the cruciate apertures 78 define four ribs 80 which connect a ring-like leading end portion 82 of the sleeve to the remainder of the sleeve.

The transverse portions 84 of the cruciate slots 78 are arranged to define two opposed ribs 86 which are radially offset from the ribs 80 and in the radial direction extend generally perpendicular thereto. The apertures 76 and cruciate apertures 78 additionally define therebetween two arcuate segments 88. The ribs 86 connect the arcuate segments 88, the ribs 80 and the ring-like leading end portion 82 to the remainder of the sleeve. It will be appreciated that this arrangement of apertures, interconnecting ribs and arcuate segments defines a collapsible zone adjacent the end 72 of the sleeve. It will also be appreciated that the portions of the cruciate apertures 78 extending lengthwise of the sleeve from the transverse portions 84 to the barbed end of the sleeve also contribute, albeit to a lesser extent, to the collapsibility of the sleeve.

In use to form a joint between two members, the camming element 10, pin 12 and sleeve 14 are fitted together in suitable bores and recesses provided in the joint members. In more detail, the camming element is fitted into a recess formed in a major face of one edge of a first joint member and spaced a predetermined distance from an edge of the joint member. The recess housing the camming element communicates with the edge of the first joint member by means of a bore extending perpendicular to the axis of the recess. The head portion 22 of the pin 12 can be inserted into the cavity 20 of the camming element by aligning the oblong opening 26 with the bore in the first joint member and inserting the pin 12 and sleeve 14 into that bore. When so fitted, the end of the sleeve provided with the barb 74 protrudes from the joint member. This end of the sleeve is push-fitted into a recess defined in an edge of the second joint member thereby forming a loose joint between the two members.

In order to tighten the joint between the two members, the camming element 10 is rotated about its axis of rotation 40 to bring the camming surfaces 32, 34 into engagement with the engaging surface 36 of the pin 12. As the camming element is so rotated the neck 30 enters the slot 28 and the end face 72 of the sleeve 14 bears against the periphery of the camming element on either side of the slot. The engagement between the sleeve 14 and the camming element prevents longitudinal movement of the sleeve relative to the camming element so that as the camming element causes the pin to move toward the axis of rotation 40, there is relative movement between the sleeve 14 and the pin 12. This relative movement between the pin and the sleeve causes the frusto-conical portions 64, 66, 68 to be drawn axially inwardly of the sleeve and thereby radially expand the barbed end of the sleeve. It will be appreciated that the extension of the cruciate aperture 78 into the barbed end of the sleeve facilitates expansion of the sleeve. This expansion of the sleeve firmly fixes the sleeve and pin 12 in the recess in the second joint member.

Further rotation of the camming element generates a compression force in the sleeve which causes partial collapse of the sleeve in the region of the ribs 80, 86. It will be appreciated that the compression force arises because the sleeve is fixed in position between the recess in the second joint member and the periphery of the camming element and that if the sleeve was not capable of collapse further rotation of the camming element by means of conventional hand tools would be extremely difficult if not impossible.

The additional rotation of the drum made possible by the collapse of the sleeve 14 provides two benefits. Firstly, if there is any gap between the joint members once the barbed end of the sleeve is expanded into its recess in the second joint member, the gap is closed.

Secondly, the collapse of the sleeve allows the two joint members to be pulled together putting the joint members into compression in the region of the joint.

Figure 7:
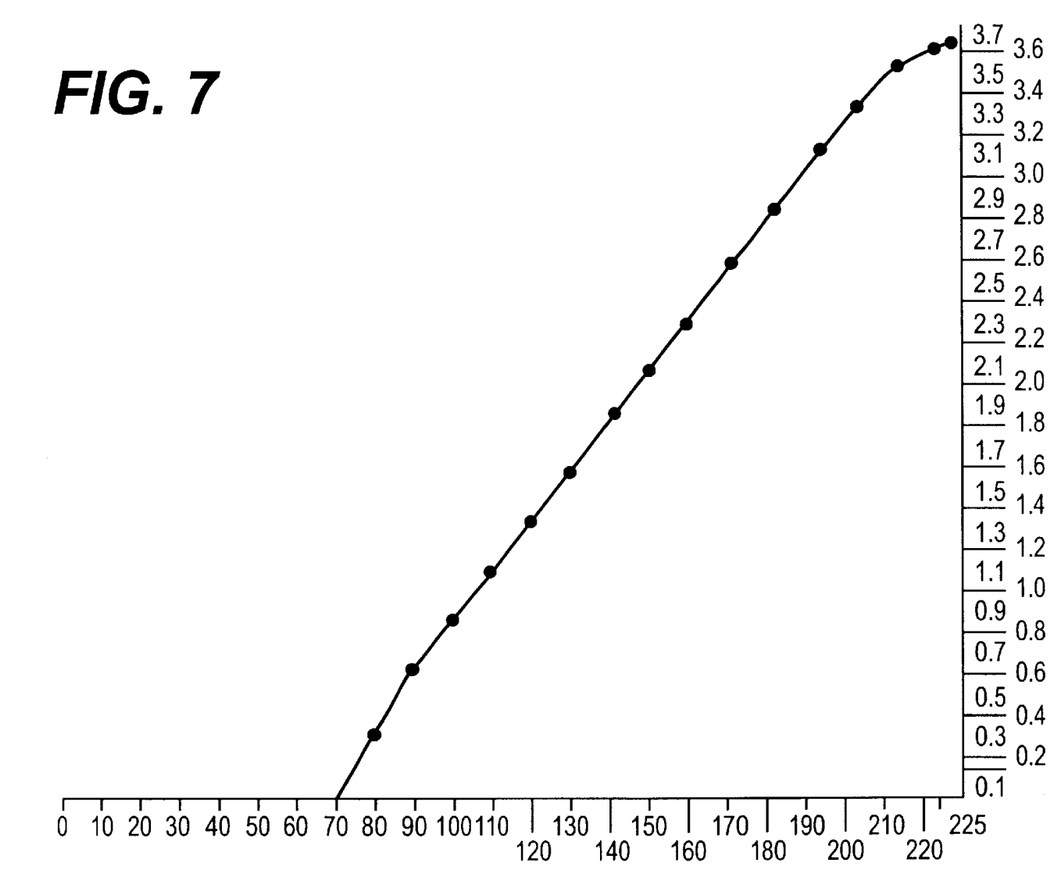
FIG. 7 is a graph showing the relationship between the amount of rotation of the camming element of FIG. 2 and longitudinal movement of the elongate fastening element of FIG. 4 caused by such rotation.

FIG. 7 shows the relationship between the amount of rotation of the camming element 10 and the longitudinal movement of the pin 12 caused by such longitudinal movement. The amount of longitudinal movement in mm is indicated along the vertical axis of the graph and the amount of rotation in degrees is indicated along the horizontal axis. It will be noted that the relationship between rotation and longitudinal movement is substantially linear throughout the range of rotation of the camming element. In the embodiment, the relationship is that for each 10 degrees of rotation of the camming element in the tightening direction, approximately 0.25 mm of longitudinal movement of the pin is caused.

This provides a relatively low gearing compared with the conventional prior art camming elements, discussed with reference to FIG. 1 and thus the user is required to input less torque in order to rotate the camming element. It will be appreciated that this is a preferred embodiment. In practice it is envisaged that to obtain this 'low torque' effect the arcuate profile of the camming surfaces should be adapted to cause less than 0.3 mm of pin movement for each 10 degrees of rotation.

A further benefit of the relatively shallow curve of the arcuate camming surfaces is that lock-up can be achieved at substantially any point of engagement of the engaging surface and the camming surfaces. In the preferred embodiment, this lock-up is augmented by the locking mechanism provided by interengagement of the depressions 42 and protrusions 44 in order to provide a secure joint.

In the embodiment, the linear relationship between camming element rotation and longitudinal pin movement exists substantially throughout the range of pin movement. In practice it is envisaged that at the opposites ends of the range there may be some departure from this linear relationship. At positions of maximum rotation it may be necessary to vary the curvature of the camming surfaces due to problems with coring in the moulding process. At the opposite end of the camming surfaces, where engagement with the head portion 22 first occurs, it may be necessary to provide a steeper curve to prevent the ribs which define the camming surfaces becoming too thin at the periphery of the drum. It is, however, preferred that there is a linear relationship between camming element rotation and pin movement over at least 75 percent of the range of said camming element rotation.

Referring to FIGS. 1 and 7, it will be noted that the camming element must be rotated through an angle of 50 to 70 degrees before engagement of the camming surfaces and the head portion of the pin occurs. The extent of this pre-engagement rotation is determined by the dimensions of the opening through which the head portion is inserted into the camming element central cavity and the position of the camming surfaces relative to the periphery of the camming element. A further determining factor is the lengthwise curvature of the camming surfaces at the point of first engagement with the head portion of the pin. In a camming element having camming surfaces adapted to provide a constant relationship of less than 0.3 mm axial movement for 10 degrees of rotation, pick-up will tend to occur later than in a camming element having the same diameter and utilising a conventional two-phase camming surface.

It will be appreciated that by configuring the slot 28 to allow rotation beyond 190 degrees, the camming element 10 is able to provide linear camming action requiring low torque input with a range of longitudinal movement of the pin comparable to that obtained using a conventional camming element. This is particularly useful where the camming element is used with a collapsible sleeve such as the sleeve of the embodiment. This allows the camming element to be configured to provide sufficient longitudinal movement of the pin to expand the barbed end of the sleeve and collapse the opposite end of the sleeve.

It will be appreciated that the camming element 10 and the joint forming device described herein will function to form a satisfactory joint even where there is a relatively wide degree of inaccuracy of the positioning of the recess for the camming element relative to the edge of the joint member. The camming element and the joint forming device can therefore be characterised as more tolerant than conventional camming elements and joint forming devices.

Figure 8:
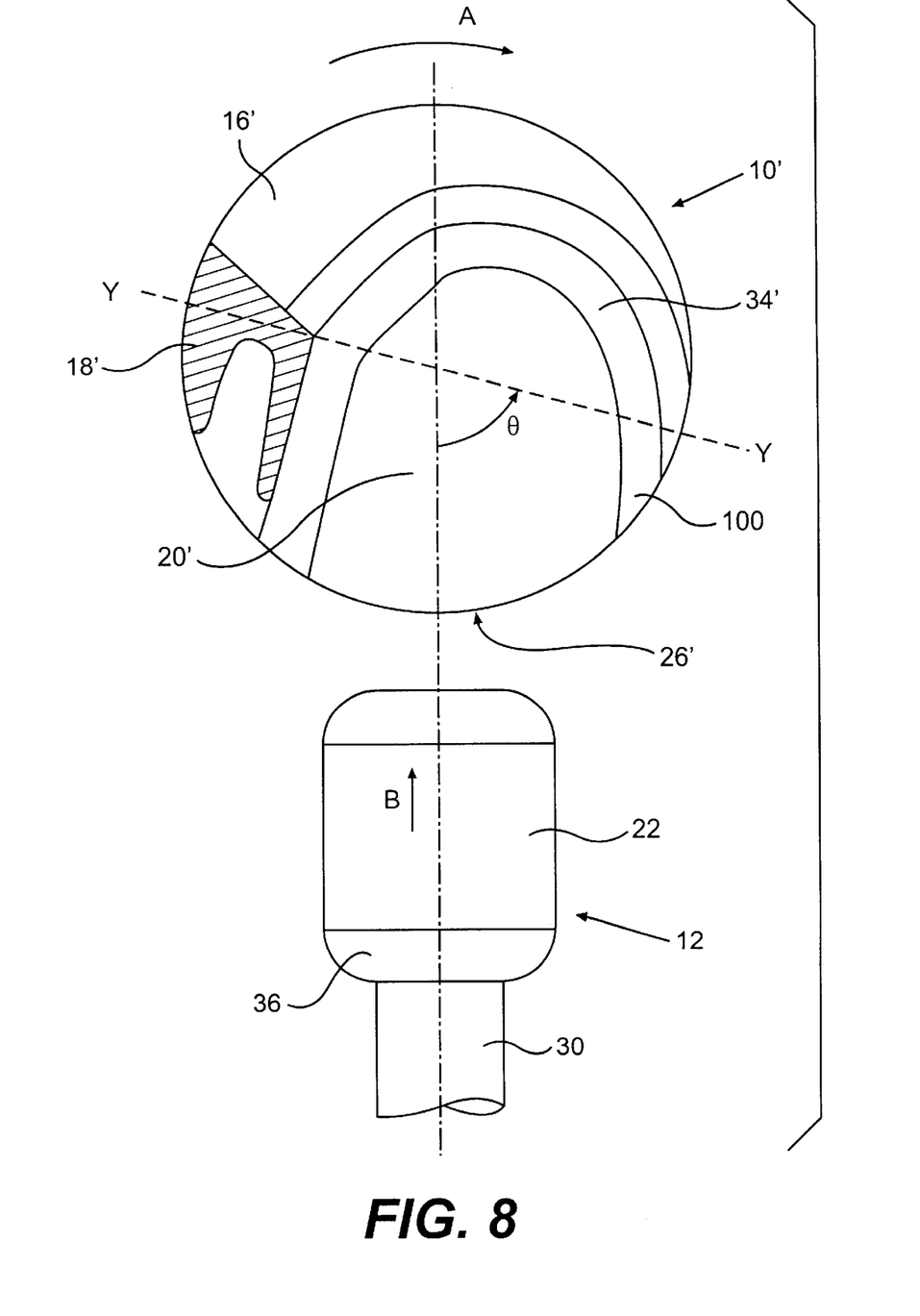
FIG. 8 is a sectional view of an alternative form of camming element.

FIG. 8 shows an alternative embodiment of camming element to that seen in FIGS. 5 and 6. The basic structure of this modified camming element 10' in FIG. 8 is essentially the same as the camming element 10 described above. This camming element 10' has a cylindrical drum-like body which comprises two generally cylindrical portions 15', 16' which are interconnected by means of a web 18'. The drum-like body defines a centrally disposed cavity 20' for receiving a head portion 22 of a pin 12, a generally oblong opening 26' through which the pin head portion can be inserted into the cavity and a slot 28' which extends circumferentially about the body. The slot 28' is sized to receive a neck portion 30 of the pin 12 when, in use, the camming element 10' is rotated clockwise in the direction of arrow A (as seen in FIG. 8) with the head portion 22 received in the cavity 20'.

The drum-like body further defines two camming surfaces 32', 34' disposed one on each side of the slot 28'. The camming surfaces 32', 34' are adapted for engaging an engaging surface 36 of the pin head portion 22. In the lengthwise direction thereof, the camming surfaces 32', 34' have an arcuate profile which is configured such that when the camming element 10' As rotated whilst pin head portion 22 is engaged with the camming surfaces, the pin 12 is caused to move longitudinally in the direction of arrow B towards the axis of rotation 40' of the camming element. Other features of the camming element 10', such as the particular profile and configuration of its arcuate camming surfaces, essentially correspond to those previously described in relation to the camming element 10' seen in FIGS. 5 and 6 and thus will not be described again.

Web 18' in camming element 10' has a generally U-shaped cross-section and is defined by relatively thin walls, in the range of 0.4 mm to 1.0 mm thickness. The purpose of this design is to minimise the amount of material that has to be used, saving weight and hence cost, whilst at the same time enhancing the strength and rigidity of the structure to ensure that the body portions 15' and 16' are maintained in a fixed spaced apart relationship. It will also be seen that the web' 18 has been arranged at an oblique angle to the direction of longitudinal movement (along arrow B) of the pin 12, unlike the web 18 of carting element 10 which is arranged generally in line with this direction of movement. The reason for this lies in the manner of manufacture of the camming element 10'.

The camming element 10' seen in FIG. 8 is formed by diecasting in a so called open and shut mould tool, that is to say, a tool which essentially only requires two movable parts, because practically all of the detailing for the element can be contained within the coring for the two parts. In fact, a side action will be needed to form the screw driver slots or equivalent feature in the end face of the element. Web 18' here has been chosen to lie at an oblique angle relative to the direction of movement of the pin 12, which is indicated by arrow B, when the camming element 10' is in its position for first receiving the head portion 22 of the pin, i.e. the position shown in FIG. 8.

This is to enable the split line of the mould tool, i.e. the interface at which the two parts of the mould tool come together to define the mould space in which the element is formed, also to lie at an oblique angle. In FIG. 8, the mould split line is indicated by the dashed line YY, which can be seen at oblique angle θ to the direction of arrow B. It will be seen that the legs of the web 18' are slightly tapered. This gives them the necessary draft angle to enable the element to be ejected from the mould tool after casting. Both the legs of the web 18' and the entry zone 100 to the two opposed camming surfaces 32', 34' are aligned with the line of draw of the mould tool, ie. the direction of movement of the two mould tool parts, which is perpendicular to the split line. The advantage of this particular arrangement is that it enables the opening 26' in the camming element 10', through which the head portion 22 of the pin 12 must initially pass, to be made as small as possible. In effect, this allows the entry zone 100 of the two opposed camming surfaces 32', 34' to extend further round relative to the web 18', thus effectively extending the overall arcuate length of these camming surfaces. What this means is that the camming action of the camming element 10' in FIG. 8 is effectively able to operate over an even greater rotational range. This is achievable whilst still being able to produce the camming element 10' by a diecasting process using an open and shut mould tool, essentially without requiring the use of any side actions. Those skilled in the art of diecasting will appreciate the advantages of this. By setting the split line YY of the mould at an oblique angle θ of about 75°, as no seen in FIG. 8, it should be possible to obtain about an extra 15° of potentially operational rotation of the camming element 10'. Thus, the range of the camming action of the camming element 10' in FIG. 8 could be as much as 240°.

It will be understood that the potential range of camming action of a camming element will be limited by certain predetermined factors, such as the dimensions of the pin that is to be used and the diameter of the camming element itself, as well as by design considerations to ensure that the element has sufficient strength and rigidity. Within these constraints, however, it will be appreciated that by careful selection of the mould split line, a maximum range of camming action can be provided, whilst the element can still be made in a two part mould tool.

What is claimed is:

1. A camming element for a device for forming a joint between two members, the camming element comprising a body which has an axis of rotation and defines a generally centrally disposed cavity for receiving a head portion of an elongate fastening element, an opening through which said head portion can be inserted into said cavity and a slot extending from said opening about said body for receiving a neck portion of said fastening element so that when, in use, the camming element is rotated in one direction about said axis of rotation with said head portion received in said cavity, said body further defining at least one camming surface which is adapted for engaging said head portion and having, in a lengthwise direction thereof, an arcuate profile which is configured such that rotation of the camming element in said one direction causes longitudinal movement of said fastening element towards said axis of rotation and said slot further is adapted to permit said rotation in said one direction through an angle of at least 190 degrees.

2. A camming element as claimed in claim 1, wherein said slot is adapted to permit said rotation in said one direction through an angle of up to 225 degrees.

3. A camming element as claimed in claim 1, wherein the arcuate profile of said camming surface is adapted such that the ratio of the amount of said longitudinal movement to the amount of rotation of the camming element in said one direction is substantially constant over at least 75 percent of the range of said rotation of the camming element.

4. A camming element as claimed in claim 3, wherein said arcuate profile is adapted to cause less than 0.3 mm said longitudinal movement for each 10 degrees of rotation of the camming element in said one direction.

5. A camming element as claimed in claim 4, wherein said arcuate profile is adapted to cause approximately 0.25 mm said longitudinal movement for each 10 degrees of said rotation of the camming element.

6. A camming element as claimed in claim 3, wherein the ratio of the amount of said longitudinal movement to the amount of rotation of the camming element in said one direction is substantially constant substantially throughout the range of rotation of the camming element.

7. A camming element as claimed in claim 1, wherein in directions transverse the lengthwise direction thereof, the camming surface is concave.

8. A camming element as claimed in claim 1, wherein said body is generally cylindrical.

9. A camming element as claimed in claim 8, wherein said body comprises first and second cylindrical portions which are spaced apart axially and which are interconnected by web means.

10. A camming element as claimed in claim 9, wherein said web means comprises a generally U-shaped section.

11. A camming element as claimed in claim 9, wherein said web means defines the limit of said rotation in said one direction.

12. A camming element as claimed in 9 or 10, wherein said camming surface is defined by a rib projecting from one of said cylindrical portions.

13. A camming element as claimed in claim 8, wherein said body has a diameter of approximately 15 mm or less.

14. A camming element as claimed in claims 1, 2, 7 or 8, further comprising formations adapted to cooperate with said head portion of the fastening element for facilitating interlocking engagement therewith.

15. A camming element as claimed in claim 14, wherein said formations comprise a plurality of depressions disposed said camming surface.

16. A camming element as claimed in claims 1, 2, 7 or 8, wherein said slot is adapted to permit said rotation in said one direction through an angle of up to 240 degrees.

17. A camming element as claimed in claim 16 wherein the camming element is formed by diecasting in an open and shut mould tool having two parts which meet at a split line, and wherein the split line of the mould tool is selected to lie at an oblique angle to said direction of longitudinal movement of the fastening element when the camming element is in its position for first receiving the head portion of the fastening element.

18. A camming element as claimed in claim 17 wherein said oblique angle is approximately 15 degrees from perpendicular to said direction of longitudinal movement of the fastening means.

19. A device for forming a joint between two members, said joint forming device comprising a camming element as claimed in claims 1, 2, 7 or 8 and said elongate fastening element having a head portion.

20. A device as claimed in claim 19, further comprising a sleeve for said fastening element, said sleeve being adapted such that when, in use, said head portion of the fastening element engages the or each said camming surface a first end thereof engages a peripheral surface of said camming element at least for a substantial portion of the extent of said rotation of said camming element in said one direction and having a second end cooperable with said fastening element such that said longitudinal movement of said fastening element causes said second end to expand radially outwardly of the longitudinal axis of said sleeve.

21. A device as claimed in claim 20, wherein said sleeve comprises a wall provided with collapsing means whereby the sleeve is partially collapsible in the lengthwise direction thereof.

22. A device as claimed in claim 19, wherein said head portion defines a convex engaging surface for engaging said camming surface.

23. A camming element for a device for forming a joint between two members, the camming element having an axis of rotation and comprising at least one camming surface which in the lengthwise direction thereof has an arcuate profile, said camming surface being arranged for engaging a head portion of an elongate fastening element such that rotation of the camming element in one direction causes longitudinal movement of the fastening element towards said axis of rotation and said arcuate profile being configured to provide a constant relationship between the amount of said longitudinal movement and said rotation in said one direction over at least 75 percent of the range of said rotation with the amount of said longitudinal movement being less than 0.3 mm per 10 degrees of rotation.

24. A camming element as claimed in claim 23, wherein the relationship between the amount of said longitudinal movement and said rotation in said one direction is less than 0.3 mm per 10 degrees of rotation substantially throughout the range of said rotation.

25. A camming element as claimed in claim 23, wherein said arcuate profile is adapted to cause approximately 0.25 mm of said longitudinal movement per 10 degrees of rotation of the camming element.

26. A camming element as claimed in claim 23, 24 or 25, wherein directions transverse said lengthwise direction, said camming surface is concave.

27. A camming element as claimed in claim 23, wherein said camming element is generally cylindrical and has a diameter of approximately 15 mm or less.

28. A device for forming a joint between two members, the device comprising a camming element as claimed in claim 23 and said elongate fastening element having a head portion.

29. A device as claimed in claim 28, wherein said head portion defines a convex engaging surface for engaging said camming surface.

30. A device as claimed in claim 28 or 29, further comprising a sleeve for said fastening element, said sleeve being adapted such that when, in use, said head portion of the fastening element engages said camming surface, a first end thereof engages a peripheral surface of said camming element at least over a substantial portion of the extent of said rotation of said camming element in said one direction and having a second end cooperable with said fastening element such that said longitudinal movement of said fastening element causes said second end to expand radially outwardly of the longitudinal axis of said sleeve.

31. A device as claimed in claim 30, wherein said sleeve comprises a wall provided with collapsing means whereby the sleeve is partially collapsible in the lengthwise direction thereof.

* * * * *